(12) United States Patent
Borukhoff

US010574815B2

(10) Patent No.: US 10,574,815 B2
(45) Date of Patent: Feb. 25, 2020

(54) PERSONALIZED AUDIO-VIDEO INVITATIONS USING MULTI-FUNCTION BUTTON

(71) Applicant: Mobiline, Inc., Dover, DE (US)

(72) Inventor: Stanislav Borukhoff, Dover, DE (US)

(73) Assignee: Mobiline, Inc., Dover, DE (US)

( * ) Notice: Subject to any disclaimer, the term of this patent is extended or adjusted under 35 U.S.C. 154(b) by 0 days.

(21) Appl. No.: 16/577,797

(22) Filed: Sep. 20, 2019

(65) Prior Publication Data

US 2020/0021685 A1 Jan. 16, 2020

Related U.S. Application Data

(63) Continuation-in-part of application No. 15/785,165, filed on Oct. 16, 2017, now Pat. No. 10,462,293.

(51) Int. Cl.
*H04M 3/436* (2006.01)
*H04M 3/537* (2006.01)
(Continued)

(52) U.S. Cl.
CPC ..... *H04M 3/4365* (2013.01); *H04M 3/42042* (2013.01); *H04M 3/537* (2013.01);
(Continued)

(58) Field of Classification Search
CPC .......... H04L 29/06027; H04L 65/1043; H04L 65/1096; H04M 1/2535; H04M 1/575;
(Continued)

(56) References Cited

U.S. PATENT DOCUMENTS 5,883,942 A * 3/1999 Lim ................ H04M 1/274566
379/142.01
6,738,357 B1 5/2004 Richter et al.
(Continued)

FOREIGN PATENT DOCUMENTS

WO WO-2019079269 A1 4/2019

OTHER PUBLICATIONS

"U.S. Appl. No. 15/785,165, Examiner Interview Summary dated Apr. 8, 2019", 3 pgs.
(Continued)

*Primary Examiner* — Oussama Roudani
(74) *Attorney, Agent, or Firm* — Schwegman Lundberg & Woessner, P.A.

(57) ABSTRACT

A system and method for managing phone calls by enabling the call initiator to create a personalized audio or video invitation that the call recipient may review prior to accepting the call, which is immediately connected upon acceptance. The call initiator's communication device presents a recording interface including a multi-function button that, upon selection during a countdown duration, initiates a direct call to the call recipient. However, when the multi-function button is not selected during the countdown period and prior to initiating the call, a personalized audio or video invitation is created by the call initiator and is attached to the phone call data packet in place of the conventional Caller Id data packet. The call signaling may proceed in a conventional manner (e.g., using conventional client-server signaling) except that instead of providing a standard call with Caller Id as the sole identifying information, a data packet including the personalized audio or video invitation is provided to the call recipient to review prior to accepting the incoming call, as desired.

20 Claims, 15 Drawing Sheets

(51) Int. Cl.
*H04M 3/56* (2006.01)
*H04M 3/42* (2006.01)
*H04M 1/57* (2006.01)
*H04L 29/06* (2006.01)

(52) U.S. Cl.
CPC ......... *H04M 3/567* (2013.01); *H04L 65/1076* (2013.01); *H04M 1/57* (2013.01)

(58) Field of Classification Search
CPC .. H04M 1/578; H04M 3/42042; H04M 3/436; H04M 3/533; H04M 7/006; H04M 2203/4563
See application file for complete search history.

(56) References Cited

U.S. PATENT DOCUMENTS

| | | | |
|---|---|---|---|
| 9,203,954 B1 * | 12/2015 | Van Rensburg | H04M 3/42042 |
| 9,443,244 B2 * | 9/2016 | Lyman | G06Q 30/02 |
| 9,762,729 B1 | 9/2017 | Sales et al. | |
| 10,462,293 B2 | 10/2019 | Borukhoff | |
| 2002/0073203 A1 | 6/2002 | Gilleland | |
| 2004/0120478 A1 | 6/2004 | Reynolds et al. | |
| 2005/0239496 A1 | 10/2005 | Sylvain | |
| 2008/0304470 A1 | 12/2008 | Ganganna | |
| 2009/0161854 A1 | 6/2009 | Ku et al. | |
| 2010/0091956 A1 | 4/2010 | Gopal | |
| 2011/0066941 A1 * | 3/2011 | Chipchase | G06F 3/165 715/716 |
| 2011/0205977 A1 * | 8/2011 | Gallagher | H04L 12/66 370/329 |
| 2012/0128138 A1 * | 5/2012 | Williams | H04M 1/2478 379/93.01 |
| 2012/0179829 A1 | 7/2012 | George | |
| 2014/0111596 A1 | 4/2014 | Grevers, Jr. | |
| 2014/0364094 A1 * | 12/2014 | Blackwell | H04M 1/72583 455/414.1 |
| 2015/0004953 A1 | 1/2015 | Vendrow | |
| 2015/0195689 A1 | 7/2015 | Chakravadhanula et al. | |
| 2016/0014059 A1 | 1/2016 | Rathod | |
| 2017/0048367 A1 * | 2/2017 | Karkkainen | H04M 1/57 |
| 2019/0116262 A1 | 4/2019 | Borukhoff | |

OTHER PUBLICATIONS

"U.S. Appl. No. 15/785,165, Examiner Interview Summary dated Aug. 13, 2019", 3 pgs.
"U.S. Appl. No. 15/785,165, Examiner Interview Summary dated Sep. 17, 2018", 3 pgs.
"U.S. Appl. No. 15/785,165, Final Office Action dated Jan. 4, 2019", 24 pgs.
"U.S. Appl. No. 15/785,165, Non Final Office Action dated Jul. 24, 2018", 25 pgs.
"U.S. Appl. No. 15/785,165, Notice of Allowance dated Sep. 11, 2019", 15 pgs.
"U.S. Appl. No. 15/785,165, Response filed Mar. 23, 2018 to Restriction Requirement dated Mar. 2, 2018", 9 pgs.
"U.S. Appl. No. 15/785,165, Response filed Apr. 3, 2019 to Final Office Action dated Jan. 4, 2019", 15 pgs.
"U.S. Appl. No. 15/785,165, Response filed Sep. 17, 2018 to Non-Final Office Action dated Jul. 24, 2018", 22 pgs.
"U.S. Appl. No. 15/785,165, Restriction Requirement dated Mar. 2, 2018", 6 pgs.
"International Application Serial No. PCT/US2018/056039, International Search Report dated Jan. 4, 2019", 2 pgs.
"International Application Serial No. PCT/US2018/056039, Written Opinion dated Jan. 4, 2019", 10 pgs.
"U.S. Appl. No. 16/581,642, Non Final Office Action dated Dec. 27, 2019", 19 pgs.

* cited by examiner

PERSONALIZED AUDIO-VIDEO INVITATIONS USING MULTI-FUNCTION BUTTON

CROSS-REFERENCE TO RELATED APPLICATIONS

The present application is a continuation-in-part application of U.S. patent application Ser. No. 15/785,165, filed Oct. 16, 2017, entitled "Personalized Audio/Video Invitations for Phone Calls." The contents of that application are incorporated herein by reference.

TECHNICAL FIELD

Embodiments of the present disclosure relate generally to telecommunications and social networking platforms and, more particularly, but not by way of limitation, to systems and methods for providing personalized audio/visual invitations for phone calls for review prior to accepting a call, where the user interface includes a single multi-function button that allows a user to choose between a "Pre-Screen Call" and a "Direct Call."

BACKGROUND

In today's telecommunication environment, an incoming call conventionally contains a Caller Id as an identifier of the calling party to the called party. The Caller Id enables the called party or the telecommunications carrier to block the calling party using do-not-call lists or by presenting the name of the calling party to the called party's handset. However, multiple services allow the calling party to fake or spoof the Caller Id, thus rendering the Caller Id useless and tricking the called party into accepting the call. In such circumstances, the call recipient has limited options to either accept or cancel the incoming call as no additional information is passed with the call. Thus, when a personal cellphone receives a call from an unknown number, the called party's immediate reaction may be to not accept the call. Unfortunately, important calls may be missed. On the other hand, when a business receives a call from any number, the call is immediately answered, and the business is forced to handle a number of undesirable calls.

An alternative to Caller Id is desired that enables the called party to determine whether or not to accept or deny the incoming call. Also, a user interface is desired that enables a user to choose various call-types (e.g., a Pre-Screened Call or a Direct Call) in a user-friendly manner. The systems and methods described herein address these and other needs in the art.

SUMMARY

The above and other needs in the art are addressed by providing a personalized audio or video invitation with a phone call that the call recipient may listen to/review prior to accepting the incoming call. In addition, the systems and methods described herein ensure that all signaling information sent or received by a Subscriber is confirmed by sending an additional acknowledgement of the receipt of a response. The acknowledgements and failures to acknowledge inform the communications server of the state of the call so that the communications server may adjust its own state accordingly. In sample embodiments, the personalized audio or video invitation rides on an available internet connection used to complete the call, and all intricacies of internet protocols are hidden from the Subscriber.

A communication request in accordance with the disclosed systems and methods is made with a personalized audio or video invitation that the call recipient may review prior to accepting the call, which is immediately connected upon acceptance. In this manner, the call recipient may be comforted that the incoming call is one that should be taken or, conversely, one that may be safely avoided. The personalized audio or video recorded invitation is created by the call initiator and is attached to the phone call data packet in place of the conventional Caller Id data packet. The call signaling may proceed in a conventional manner (e.g., using conventional client-server signaling) except that instead of providing a standard call with Caller Id as the sole identifying information, a data packet including the personalized audio or video invitation is provided to the call recipient to review prior to accepting the incoming call, as desired.

In sample embodiments, a method is provided for enabling call completion based on the response to a personalized audio or video invitation from a call initiator. In a first embodiment, the call initiator's communication device records a personalized audio or video invitation that typically describes the reason for the call and is provided with call completion information (e.g., session description protocol information) that is needed to provide real-time communication with a call recipient. In a second embodiment, the personalized audio or video invitation is pre-recorded and called up for use as the personalized audio or video invitation. In either embodiment, the personalized audio or video invitation is sent with the call completion information to the call recipient for review, and the call from the call initiator is placed on hold while the personalized audio or video invitation is being reviewed. The status of the review by the call recipient is received by the call initiator and displayed so that the call initiator may monitor the status of the review by the call recipient. Upon acceptance of the call pursuant to review of the personalized audio or video invitation by the call recipient, the call is completed and maintained until a disconnect request is received.

In other sample embodiments, the call recipient's communication device receives a call request including the personalized audio or video invitation from the call initiator. The call recipient then listens to or reviews the personalized audio or video invitation from the call initiator and provides a notice to the call initiator that the personalized audio or video invitation is under review. Upon acceptance of the call, the call recipient sends a response to the call initiator indicating that the call has been accepted and the call is completed. The call is maintained until a disconnect request is received.

In still other sample embodiments, the communications described herein are managed by software services implemented on a server. The server software waits for a message from a Subscriber, such as a message from the call initiator including call initiation information and a personalized audio or video invitation. Upon receipt of the message, the message is parsed and the call initiation information and the personalized audio or video invitation are uploaded to a memory device. The message containing the recorded personalized audio or video invitation is passed on to the call recipient for consideration. The server then waits for status information from the call recipient such as an indication that the personalized audio or video invitation is being reviewed. The status information is passed along to the call initiator for monitoring of the status of the consideration of the call request. Upon receipt of information from the call recipient that the invitation has been accepted, the call initiator is notified that the call has been accepted and the call is completed. The call is maintained until a disconnect request is received and communicated to each Subscriber on the call.

In further sample embodiments, the user's communications interface includes a multi-function button that allows the Subscriber to choose between the "Pre-Screen Call" and "Direct Call" functionality in a single step process. In sample embodiments, upon selecting the call recipient, the multi-function button may be selected during a short animation duration to place a Direct Call (traditional call without personalized invitation) to the call recipient. After the short animation duration, if the multi-function button has not been pressed, then the recording of the personalized audio or video invitation commences. At the end of the recording, the personalized audio or video invitation is sent with the call completion information to the call recipient for review, and the call from the call initiator is placed on hold while the personalized audio or video invitation is being reviewed, as in the other embodiments. In this fashion, the multi-function button enables the call initiator to select between a "Pre-Screen Call" and a "Direct Call" with a simple push of the multi-function button.

Also, in sample embodiments, an animation is presented during the countdown duration counting down to the start of the recording of the personalized audio or video invitation and the interface is switched to the recording interface after the countdown duration. The countdown animation may be reinitiated upon selection of a re-record button while recording of the personalized audio or video invitation is in process.

In a sample network configuration, the methods described herein are implemented in a client-server configuration where the clients include mobile devices, VOIP phones, and the like adapted to include software that enables the functionality of the call initiator and call recipient on the client devices. The server further includes software adapted to manage the processing of the personalized audio or video invitation and establishment of the call as described herein. The server may also implement other functions such as managing profiles of Subscribers, managing searches for Subscribers, storing/streaming personalized audio or video invitations from the Subscribers, and the like.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description of FIGS. 1-7 that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In the various example embodiments of a personalized audio or video invitation for phone calls as described herein, the following disclosure uses the following naming conventions:

Subscriber—user of mobile smart phone and/or VOIP phone with display;

MobiLine—a social network platform communications application that enables Subscribers to use their phone to place and receive a phone call with a personalized audio or video invitation;

Server—a back-end server that processes all requests from the MobiLine application on the Subscribers' mobile smart phones; and Video—a series of visual images that typically, though not necessarily, includes synchronized audio.

Figure 1:
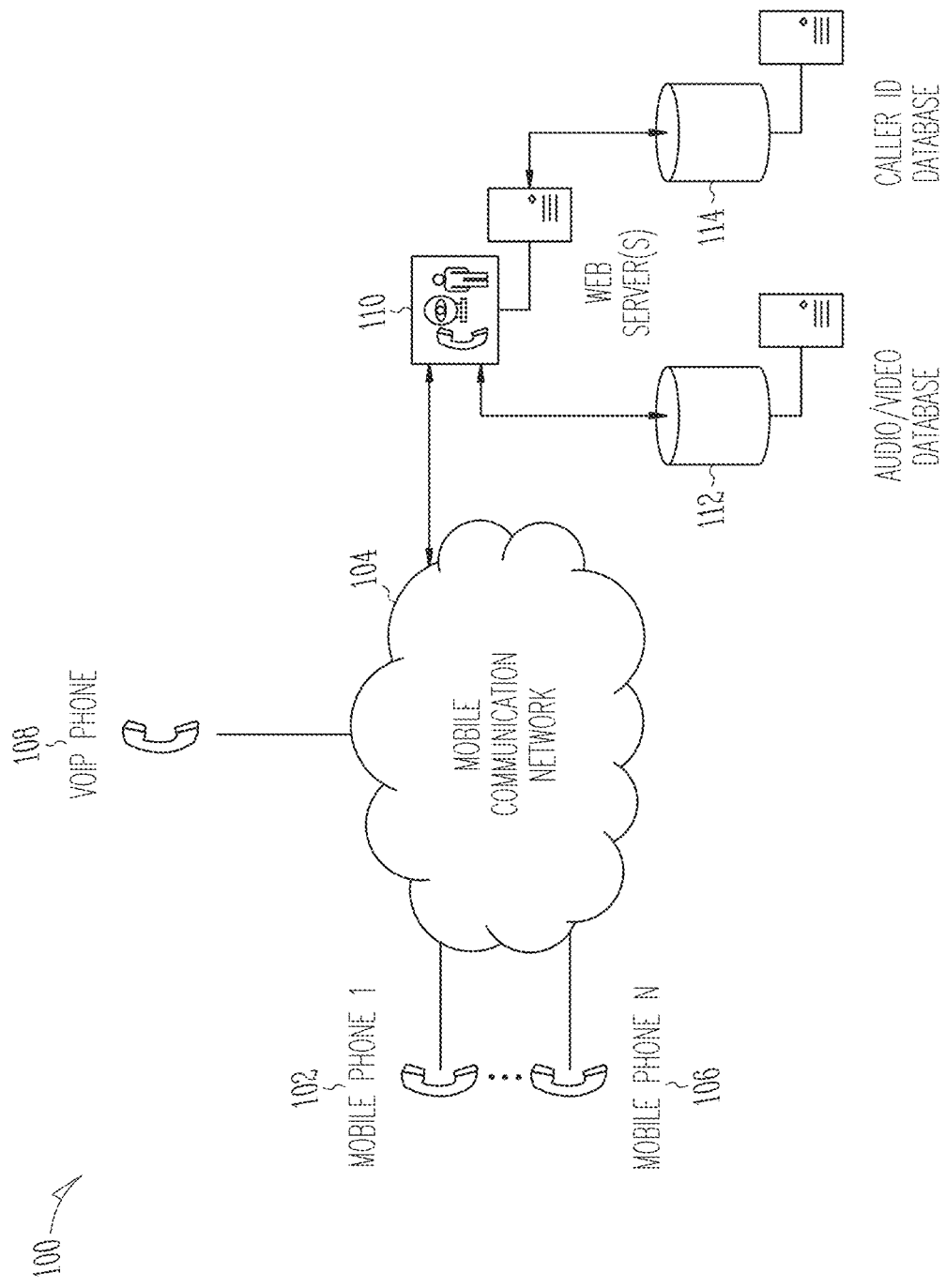
FIG. 1 is a high-level block diagram illustrating a telecommunications network adapted to implement the systems and methods described herein in sample embodiments.

FIG. 1 is a high-level block diagram illustrating a telecommunications network 100 adapted to implement the systems and methods described herein in sample embodiments. As illustrated, a Subscriber using mobile smart phone 102 may communicate via mobile communications network 104 with other mobile smart phones 106. In sample embodiments, the Subscribers may also communicate with VOIP phones and computers or other phones 108 with the capability of listening to and watching personalized audio or video invitations as described herein. In sample embodiments, the mobile smart phones 102/106 and/or VOIP phones 108 download a MobiLine app as described herein to facilitate communication via web server 110 that is adapted to provide the services described herein. As will be explained in more detail below, the web server 110 runs MobiLine software that enables Subscribers to use their mobile smart phone to place and receive a phone call with a personalized audio or visual invitation that is created by the Subscribers and stored in audio/video database 112 or created at the beginning of a call by the calling Subscriber. A caller database 114 keeps track of Subscribers to the MobiLine software system so that Subscribers may select other Subscribers with whom to communicate using the techniques described herein.

Installation and Registration Process

The Subscriber first installs the MobiLine app on his mobile smart phone and then registers with the MobiLine service either through SMS verification (6-digit code is sent to the Subscriber's device) or with Facebook or other social media account credentials. In sample embodiments, the Subscriber's telephone number is solely used for SMS verification process and is not tied to the application flow. The Subscriber telephone number remains stored in the caller database 114 and is never disclosed in any manner to another Subscriber.

During the registration process, the Subscriber enters Name, Gender, Date of Birth, and a picture. These entries define the profile of the Subscriber. The Subscriber also may optionally record an introductory audio or a video profile recording for inclusion in his profile. The Subscriber retains full control of their account at all times. The recorded Subscriber name facilitates others to search for Subscribers by name. The recorded introductory audio or video profile recording may be played to other Subscribers when they browse for Subscribers and search for specific services.

Call Initiation

After the registration process, the Subscriber is provided with a list of registered Subscribers of the MobiLine service. The Subscriber may browse or search for other Subscriber(s), watch pre-recorded introductory video profile recordings, or listen to pre-recorded introductory audio profile recordings. The Subscriber also may search and filter for particular services using search options.

Once a Subscriber has identified a party to be contacted from the list of Subscribers, the Subscriber may place a real-time call or send a message through the MobiLine service. The receiving Subscriber is immediately notified of the call or message.

Figure 2:
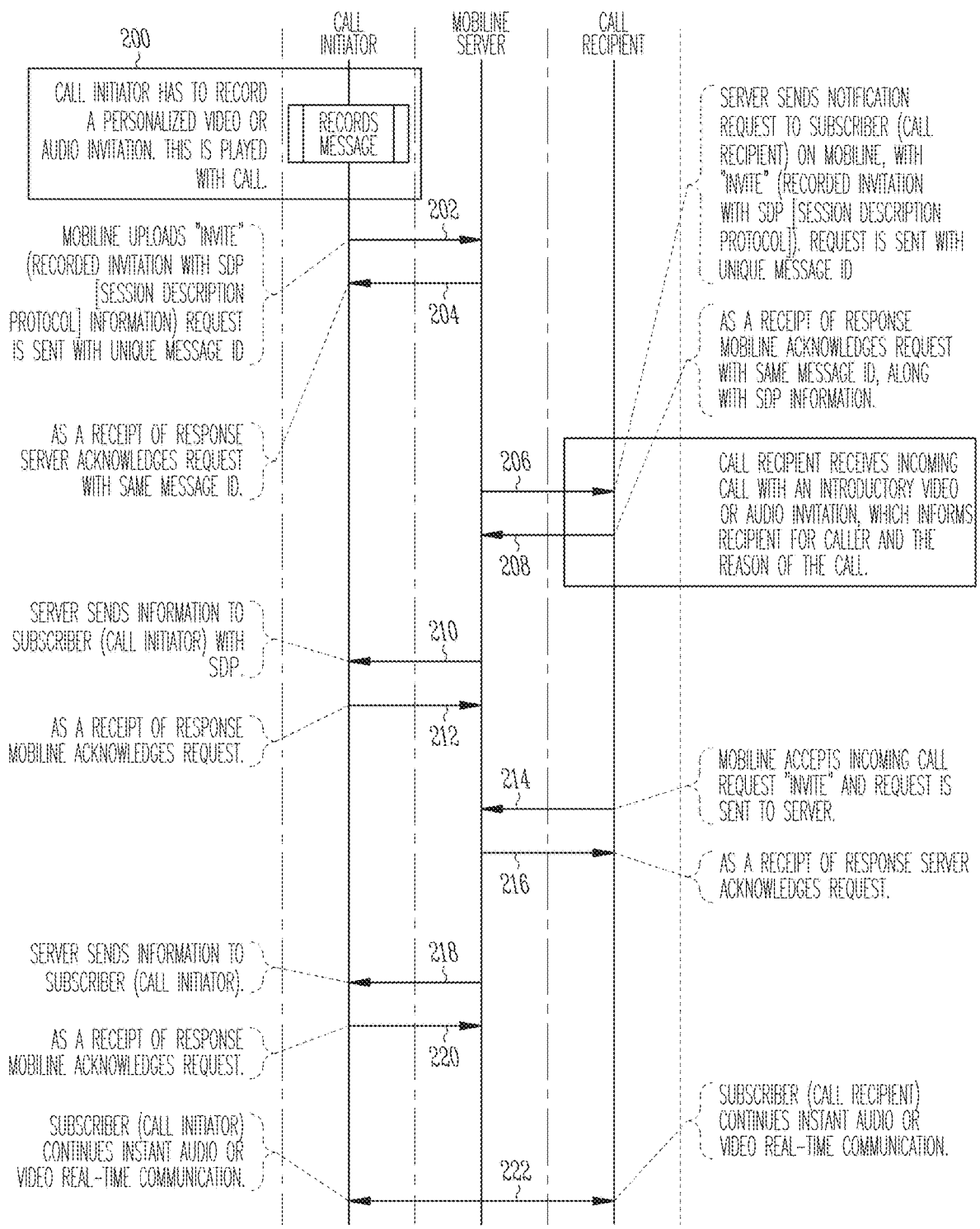
FIG. 2 illustrates the call flow for a personalized audio or video invitation sent in a sample embodiment.

FIG. 2 illustrates the call flow for a call set up using a personalized audio or video invitation sent in a sample embodiment. To place a call, Subscriber A (call initiator) records a unique personalized audio or video invitation at 200 that consists of a recorded personalized audio or video invitation to be played by the call recipient before accepting the call. Typically, the user may use the record features of his mobile smart phone to record the invitation. Conversely, the Subscriber A may have a pre-stored personalized audio or video invitation that is accessed to send as the invitation. Within the recorded personalized audio or video invitation, the Subscriber typically provides a description of the reason for the call. Subscriber A's call is placed on hold once the recorded personalized audio or video invitation is sent. The recorded personalized audio or video invitation is parsed by the MobiLine service and uploaded by the web server 110 to a storage device such as A/V database 112 at 202 along with recipient information and SDP (session description protocol) information. In sample embodiments, the SDP information contains details of a call initiator session including the unique message Id. SDP allows all end points to effectively participate in a session. The session is initiated when the connection is first established and is terminated when all of the end points have stopped participating. This process facilitates the maintenance of real-time communication over available internet connections. To ensure connection across various types of networks, STUN and ICE mechanisms are deployed. To provide a fail proof scenario, additional specifications are added to the RTP network stack. In sample embodiments, the personalized recorded audio and video invitations are binary files and maintained with base64 encoding. Also, enhanced authentication mechanisms further prevent problems with non-complaint mp4 files. At 204, the web server 110 acknowledges the request and returns the same message Id. At 206, the web server 110 sends a notification request to Subscriber B (call recipient) using the MobiLine service and includes the recorded personalized audio or video invitation provided by Subscriber A along with the SDP information. The request is also sent with the unique message Id for the session. At 208, Subscriber B sends an acknowledgement of receipt of the response including the message Id along with the SDP information to the web server 110. The web server 110 sends the received information to Subscriber A, including the SDP information and unique message Id at 210. Subscriber A acknowledges receipt of the request with the same message Id at 212.

Subscriber B then watches the personalized video invitation or listens to the personalized audio invitation. As noted above, the recorded invitation provides Subscriber B with details of the calling party and the purpose of the call. Subscriber B is given the option on his MobiLine app to accept the call, reply with a video or audio message, or cancel the incoming call. Once Subscriber B makes a selection, the selection is provided to the web server 110 at 214 with the message Id, which is acknowledged by web server 110 at 216 with the message Id. Call progress status is updated on Subscriber A's MobiLine app by sending the selection and the message Id to Subscriber A at 218. Subscriber A is also informed when their personalized audio or video invitation is being listened to or viewed by Subscriber B. Subscriber A acknowledges receipt of the selection information to the web server 110 at 220 again with the message Id. If Subscriber B elected to receive the call, the call is completed at 222 and Subscriber A and Subscriber B are enabled to continue instant audio or video real-time communication in a conventional fashion as the SDP information has already been provided to both Subscribers. On the other hand, if Subscriber B elects not to accept the call, the incoming call request is canceled and the web server 110 notifies Subscriber A that the call was not accepted. Conversely, Subscriber B may record a message and send the recorded message to Subscriber A using the same techniques as described above for the initial invitation. As noted above, the call is initiated and completed without exposing the telephone number of either Subscriber to the other Subscriber as the Subscribers' phone number remains in caller database 114 for access only by web server 110. The Subscribers' telephone numbers are used solely for the SMS verification process and are not tied to the call flow described herein.

Those skilled in the art will appreciate that the SDP information is used to define the communication end points for the call initiator and call recipient. MobiLine implements handling of SDP information between Subscribers to allow a fast handshaking during live connection. For a live request, the call initiator processes and accumulates SDP information required for a live connection, and information is sent to the live request recipient with the recorded personalized audio or video invitation. The live request recipient acknowledges the incoming live request and parses the incoming information. The live request recipient further accumulates SDP information required for the live connection, and information is sent to the live request call initiator. Mutual transfer of SDP information defines all parameters for successful live connectivity between both Subscribers. When a live request recipient presses "Accept Request", the physical access to microphone and speaker is enabled and both Subscribers are connected live. This remarkably reduces handshaking and connectivity time duration between Subscribers.

In sample embodiments, the SDP information is sent from the call initiator (Subscriber A) to the web server 110 where the SDP information is acknowledged and sent to the call recipient (Subscriber B) and acknowledged by the call recipient. Similarly, the call recipient may send SDP information to the web server 110 where the SDP information is acknowledged and sent to the call initiator and acknowledged by the call initiator. Once the call is established, the connection is maintained until the SDP information includes a call disconnect request, which is acknowledged by the web server 110 and the other party in the same fashion.

The respective Subscribers may also receive additional services from the MobiLine software such as sending audio messages, sending video messages, sending text messages, sending picture messages, or sending geo-location information to the other Subscribers. A Subscriber may also add like-minded Subscribers and friends to their favorites. A Subscriber may further administer their message inbox with messages sent or received. The MobiLine app also enables the respective Subscribers to maintain multiple virtual locations, which enables the Subscribers to, for example, search for services and/or other Subscribers in different locations.

Figure 3:
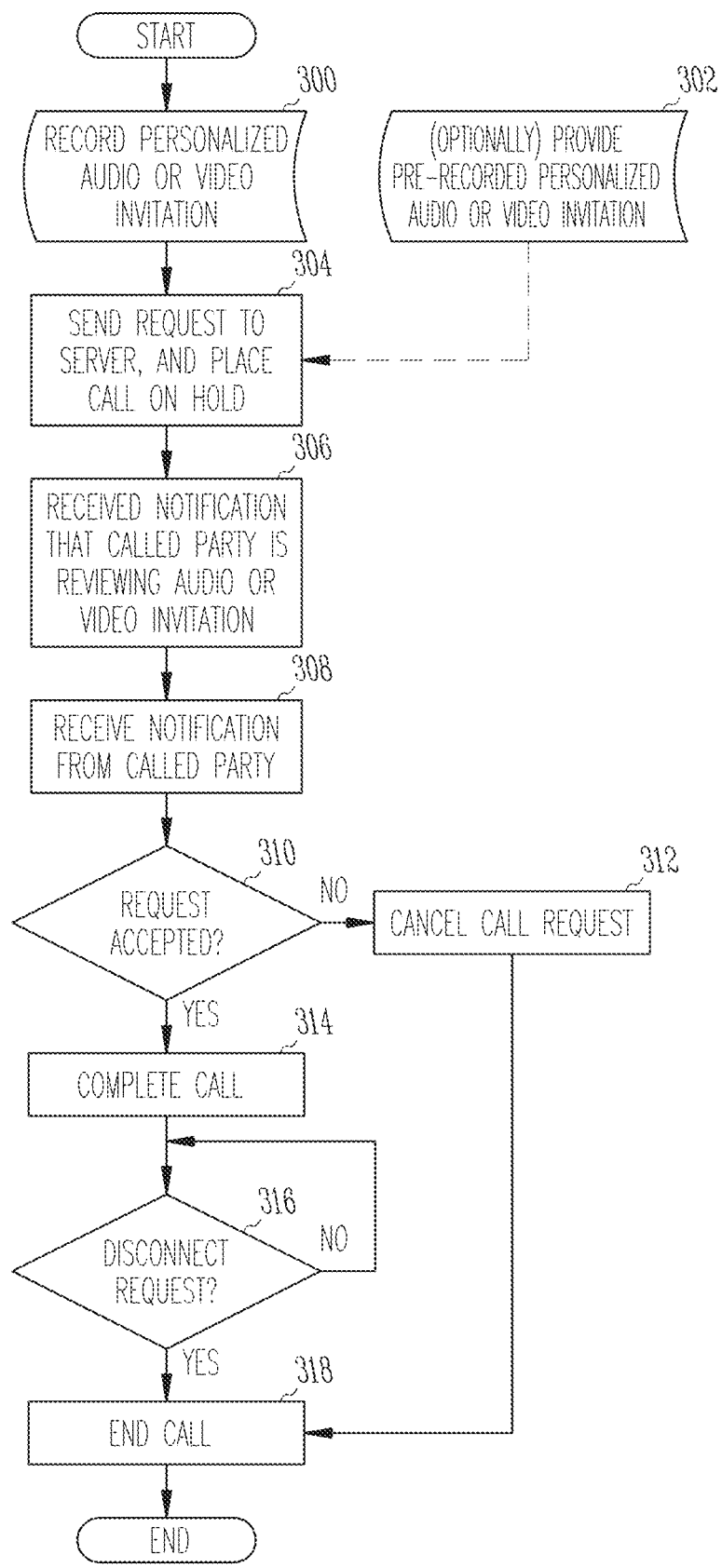
FIG. 3 illustrates a sample flow chart of the software implemented on the call initiator's mobile smart phone.

FIG. 3 illustrates a sample flow chart of the software implemented on the call initiator's mobile smart phone. As illustrated, at 300 the call initiator elects to record a personalized audio or video invitation for the call recipient, typically using the camera and recording features of the call initiator's mobile smart phone. Optionally, the call initiator may use a pre-recorded audio or video invitation stored on the call initiator's mobile smart phone or on the audio/video database 112 at 302. At 304, the recorded audio or video invitation is sent to the web server 110 and the initiator's call is placed on hold. The call initiator's call remains on hold until a message is received at 306 indicating that the called party is reviewing the recorded invitation. The initiator's call is again placed on hold until a response message from the call recipient is received at 308. If it is determined at 310 that the call recipient has elected to not receive the call, the call request is canceled at 312. However, if the call recipient has elected to accept the call, the call is completed at 314. The call is maintained until a disconnect request is received at 316. Upon receipt of a disconnect request, the call is ended at 318.

Figure 4:
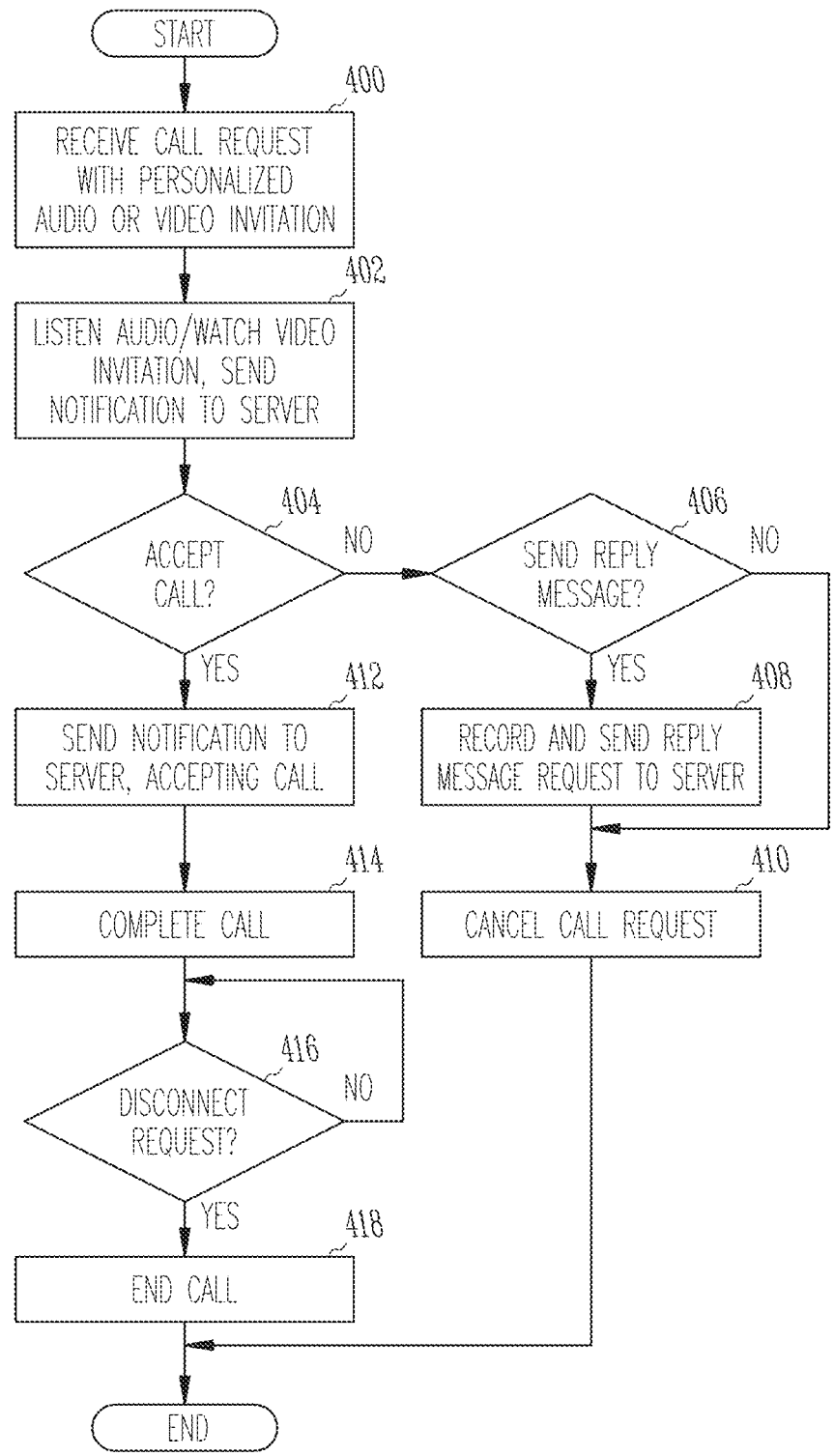
FIG. 4 illustrates a sample flow chart of the software implemented on the call recipient's mobile smart phone.

FIG. 4 illustrates a sample flow chart of the software implemented on the call recipient's mobile smart phone. As illustrated, at 400 the call recipient's mobile smart phone receives a call request with a personalized audio or video invitation. If the call recipient elects to listen to or view the personalized audio or video invitation, then at 402 the call recipient listens to or views the personalized audio or video invitation and the call recipient's mobile smart phone notifies the web server 110 that the personalized audio or video invitation is being reviewed. At 404, the call recipient decides whether or not to accept the call. If not, at 406 the call recipient may elect to send a reply message. If the call recipient elects to send a reply message, the reply message is recorded and sent at 408 using a similar process as used by the call initiator, in which a recording audio or video message is uploaded to web server 110 along with the reply message details. The incoming call request from the call initiator is then canceled at 410. On the other hand, if the call recipient elects to receive the call at 404, a response accepting the call is sent to the web server 110 at 412 and the call is completed at 414. The call is maintained until a disconnect request is received at 416, and the call is ended at 418.

Figure 5:
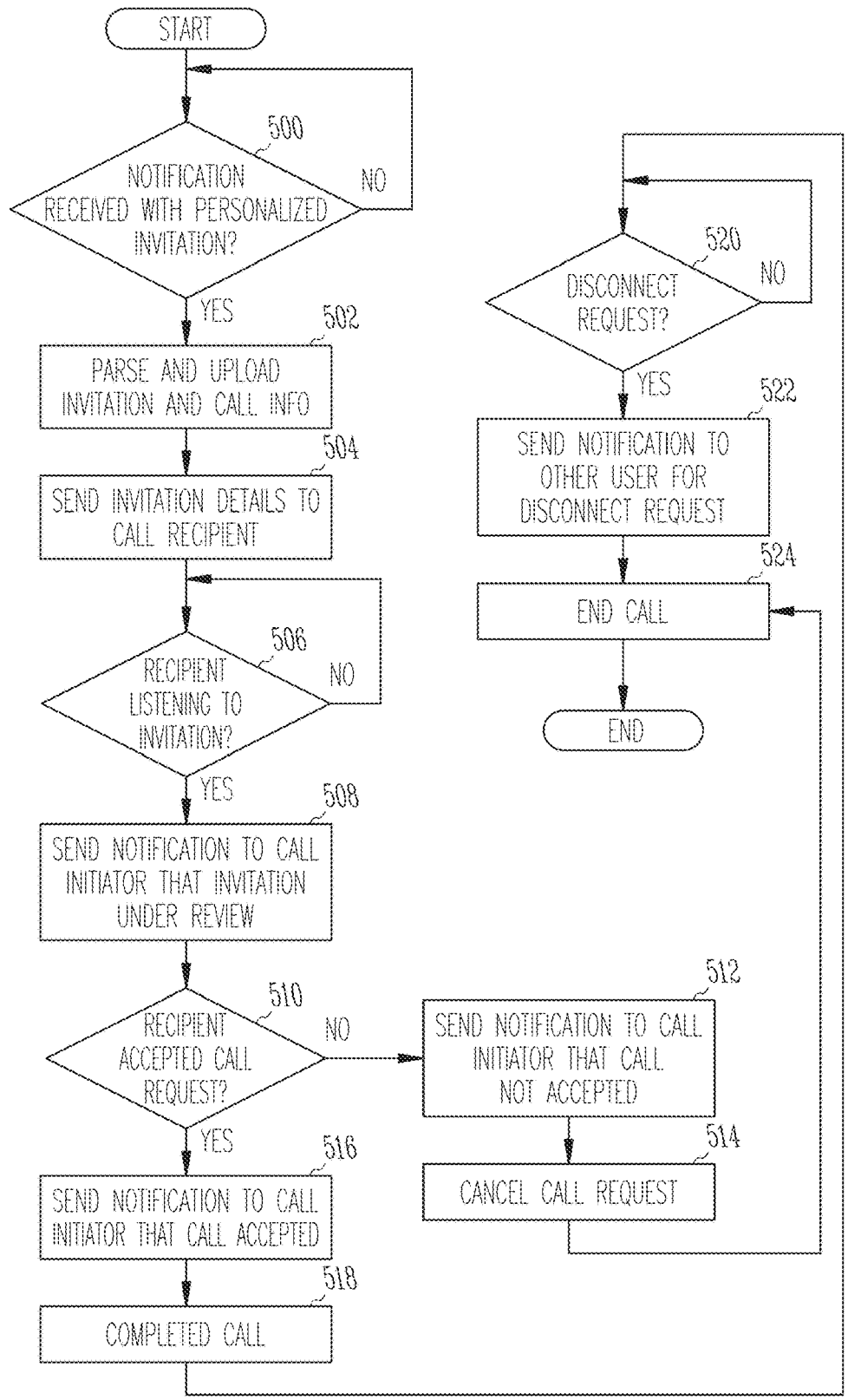
FIG. 5 illustrates a sample flow chart of the software implemented on one or more web servers to complete the call pursuant to acceptance of a personalized audio or video invitation in a sample embodiment.

FIG. 5 illustrates a sample flow chart of the software implemented on the web server 110 to complete the call with a personalized audio or video invitation in a sample embodiment. As illustrated, the web server 110 implementing the MobiLine services waits for a message at 500. Once a message is received, the message is parsed and uploaded by the web server 110 to the A/V database 112 along with the call information at 502. The message is then forwarded to the call recipient at 504. The web server 110 then waits until a notification is received that the call recipient is listening to and/or watching the personalized audio or video invitation at 506. Upon receipt of an indication from the call recipient that the invitation is being reviewed, the call initiator is notified at 508 that the invitation is under review. The web server 110 then waits at 510 for an indication from the call recipient regarding whether or not the call will be accepted. If the call recipient does not accept the call, the web server 110 notifies the call initiator at 512 that the call has not been accepted. The call is then canceled at 514. However, if it is determined at 510 that the call recipient has accepted the call, the web server 110 notifies the call initiator at 516 that the call has been accepted. The call is then completed at 518. The call remains active until a disconnect request is received at 520, at which time the parties are notified of the disconnect request at 522. The call ends at 524.

The Subscriber's interactions with the MobiLine app will now be described with respect to FIGS. 6*a*-6*g*, which illustrate screen shots from the MobiLine app on a call initiator's mobile smart phone and on a call recipient's mobile smart phone while completing a call using a personalized video invitation in sample embodiments. In particular, FIGS. 6*a*-6*g* illustrate the graphical user interfaces presented to the Subscribers during the interactions noted above during the processing of a personalized video invitation to initiate a call. The graphical user interfaces presented to the Subscribers during the processing of a personalized audio invitation to initiate a call are very similar and will not be discussed herein.

Figure 6A:
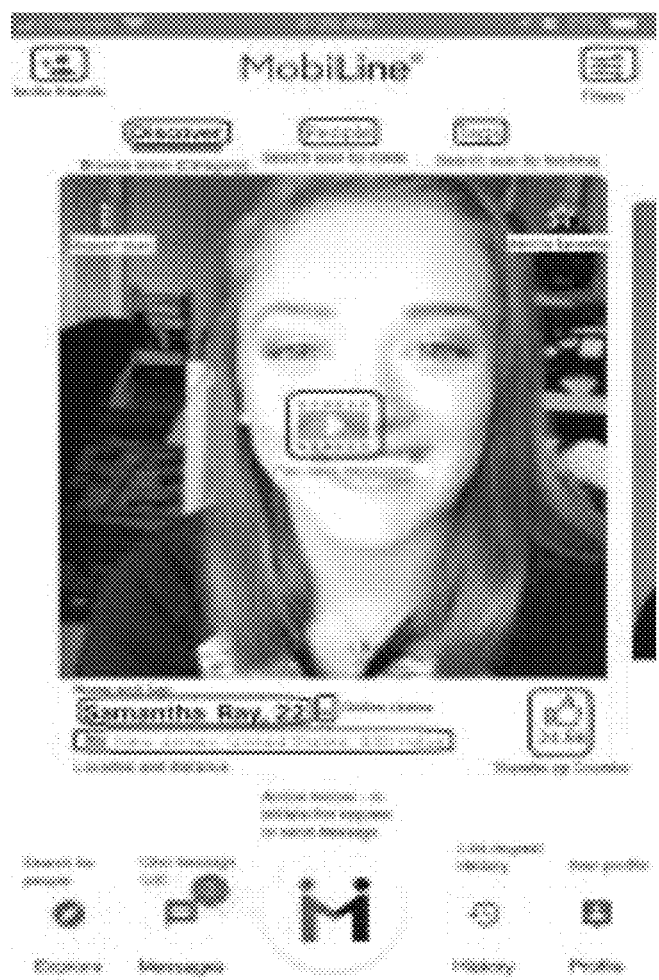
FIGS. 6*a*-6*g* illustrate screen shots of a call initiator's and a call recipient's mobile smart phone completing a call using a personalized video invitation in sample embodiments.

As shown in FIG. 6*a*, the initial screen of the MobiLine app enables a Subscriber to search for other Subscribers to contact and to search for previously tagged Subscribers. In sample embodiments, the discover functionality provides a rich interface with actions to search and browse for introductory audio or video profile greeting recordings of other Subscribers. The "Discover" feature allows Subscribers to browse other Subscribers' introductory video or audio greetings as per selected category. The "People" feature allows Subscribers to search for other Subscribers by name, while the "Tags" feature allows Subscribers to search and browse for other Subscribers based on hashtags. As illustrated in FIG. 6*a*, the Subscriber on the Explore Screen is provided with the following Actions:

1. Invite friends: used to invite friends from the contact list or other social app;
2. Filters: sets user specific distance, age, gender, and search category;
3. Report User: used to flag an inappropriate introduction greeting by blocking or "report a user" feature;
4. Add to favorite: a listed Subscriber may be added to a user's favorite list;
5. Play: listed Subscriber introductory greeting may be played/re-played;
6. Thumbs up: allows Subscriber to up-vote or down-vote;
7. Explore: current screen;
8. Messages: used to browse user message(s) list; also shows counter of unread messages grouped by user;
9. Button M: an action button that changes functionality based on screen and possible actions; under current screen it is used to initiate Live Request or Send Message to a listed user;
10. History: used to browse user live request(s) list;
11. Profile: allows Subscriber to modify profile, modify video/audio greetings, and to modify settings.

Figure 6B:
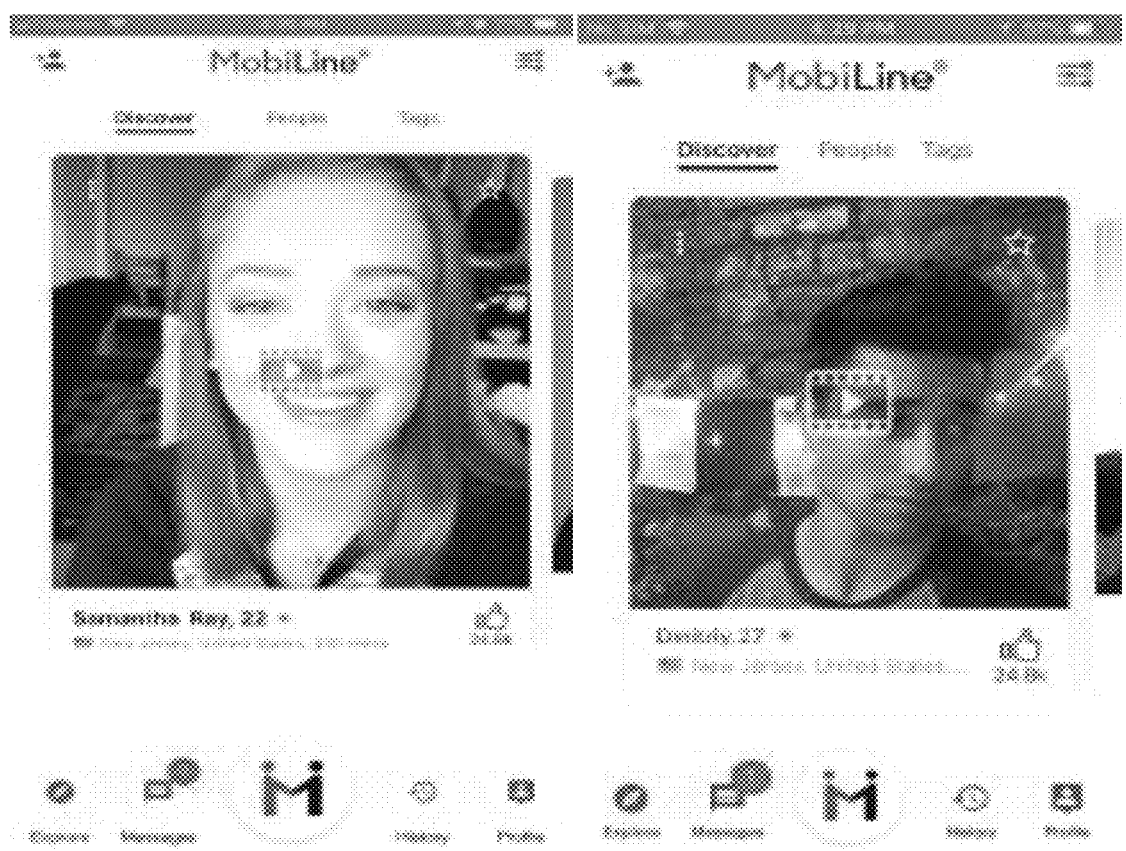
Figure 6C:
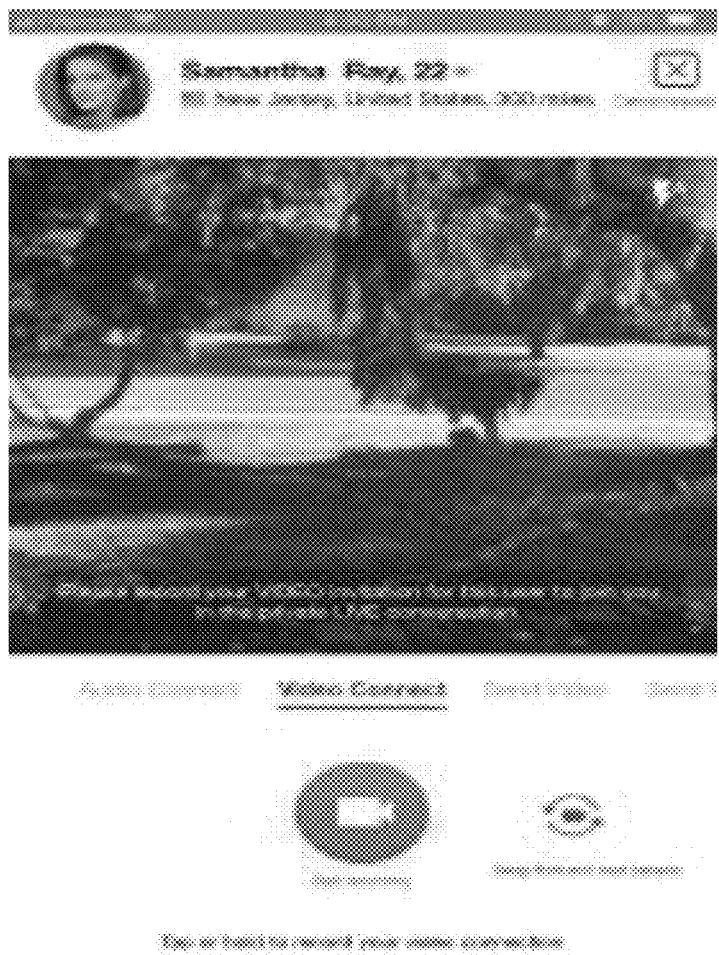

Prior to initiating a call, the call initiator (Subscriber A—left side of FIG. 6*b*) may browse for known Subscribers or other Subscribers based on the call initiator's preference (e.g., Age, Gender, Location). Upon selection of a Subscriber found in the search, the call initiator (Subscriber A) listens to/watches pre-recorded introductory audio or video profile recordings from the profiles of the selected Subscribers as illustrated in FIG. 6b. Once the call initiator (Subscriber A) finds a recipient for a conversation, the call initiator clicks the MobiLine app icon (M button) to create a personalized audio or video invitation for the selected Subscriber. Subscriber A sees the screen of FIG. 6c and is requested to record a video or audio live request that will be sent to Subscriber B. The Subscriber (Call Initiator) selects one of the following:

Audio Connect: personalized audio invitation will be sent to recipient, while initiator waits for live connection;

Video Connect: personalized video invitation will be sent to recipient, while initiator waits for live connection;

Send Video: personalized video message will be sent to recipient, while initiator proceeds to Discover;

Send Audio: personalized audio message will be sent to recipient, while initiator proceeds to Discover.

Once the user selected the desired message type (e.g. Video Connect), the Subscriber then starts the recording process. The mobile smart phone's camera and audio recording circuitry is enabled, and the initiating Subscriber is prompted to record a personalized audio or video invitation to send to the selected Subscriber to ask the selected Subscriber to join in a live private conversation. The call initiator records the message, and the MobiLine app provides a visual representation of the duration of the message being recorded. To stop recording, Subscriber A clicks on a "Stop" button. The call initiator may replay the recorded personalized audio or video invitation. If not satisfied, the call initiator may click "delete" or "re-record" and re-record the personalized audio or video invitation. To cancel the call request, the call initiator may select "cancel" to cancel the request and return to the discover screen. Alternatively, the call initiator may elect to send the recorded invitation to the selected Subscriber by selecting "send introductory message."

From the home screen of the MobiLine app, the Subscriber may also review messages, check his connections history, and update his Subscriber profile, filters, or settings, including the stored introductory audio or video profile recordings that other Subscribers will receive in response to a search, along with the Subscriber's picture. The Subscriber may also add/change/remove a location based on city and country name, may exclude a specific Subscriber listing by implementing a blocking or "report a user" feature. Alternatively, another Subscriber that is contacted frequently may be added to a Favorites List.

Figure 6D:
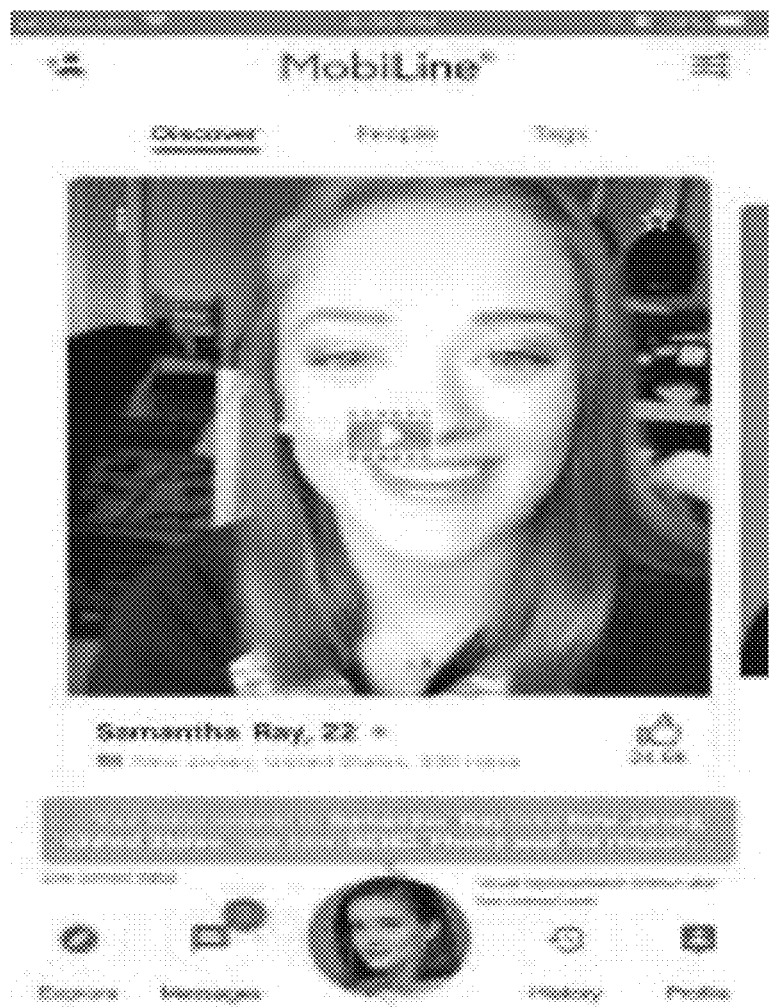

After the call initiator sends the personalized audio or video invitation to the call recipient (Subscriber B), the call initiator (Subscriber A) waits for a response from the call recipient as discussed above. In sample embodiments, a timer or other indicator may be used to reflect the progress of the request. As noted above, the call initiator is notified when the personalized audio or video invitation is under review by the call recipient and a timer (if provided) may start counting. A sample interface for the call initiator while awaiting the response from the call recipient is shown in FIG. 6d.

Figure 6E:
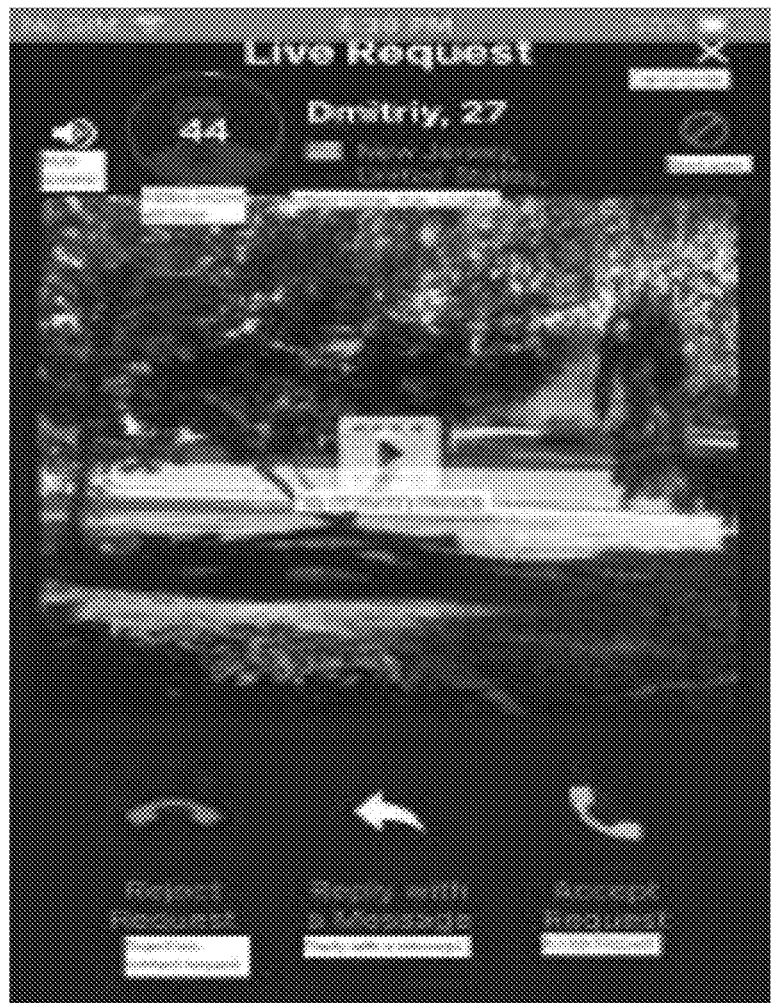
Figure 6F:
Figure 6G:

The call recipient (Subscriber B) receives the notification of the incoming live call request and receives the call initiator's details along with the personalized audio or video invitation for review. A sample interface for the call recipient upon receipt of the invitation is shown in FIG. 6e. As illustrated in FIG. 6e, the call recipient is given the option to play the invitation by clicking on the "Play" button. Selecting "Play" also initiates notification to the call initiator that the call recipient is reviewing the invitation. After review of the personalized audio or video invitation, the call recipient may opt to replay the message or to select one of the options of rejecting the request to cancel the incoming request, replying with a message, or accepting the request. If the request is accepted by clicking "Accept Request," the call initiator is notified that the invitation has been accepted and the Subscribers proceed immediately to a live one-to-one communication. The respective Subscribers then see an interface such as that illustrated in FIG. 6f for the duration of the call.

For the duration of the call, each Subscriber may elect to stop the video and continue the call on audio alone. The Subscriber also may swap the camera from front camera to back and vice versa and optionally mute the microphone as during conventional calls. The Subscriber may stop the live connection at any time by electing to disconnect the call. If a Subscriber switches off/on the camera, the other Subscriber may receive appropriate notification. The call may then proceed with the other Subscriber's picture in the middle of the screen. In sample embodiments, during a live video connect, the Subscriber's video feed is displayed on the full screen with the current Subscriber's video feed in a small circular video display. Video feed screens for a Subscriber may be swapped by clicking on the video feed. The full screen video feed may be minimized with a swipe from top to bottom, which enables the live connect session to proceed and for other tasks to be performed in parallel on the MobiLine app. Also, the Subscriber may elect to move the smaller image across the screen as desired.

When a call is completed, a Subscriber may disconnect the live connection. The MobiLine app then returns to its previous state to enable the Subscriber to continue browsing for greetings and to initiate live requests or send messages.

It will be appreciated that a call recipient may not be in the MobiLine App at the time an invitation is received from the call initiator. In such cases, the MobiLine services web server 110 searches for the call recipient (Subscriber B). If the call recipient is not on the MobiLine app, then the MobiLine service generates a Push notification and sends a live request notification to the call recipient as illustrated in the right side of FIG. 6g. Once the call recipient plays the personalized audio or video invitation, the call initiator (Subscriber A) is so notified as discussed above. The call recipient (Subscriber B) may extend the incoming Push request without activating the MobiLine app and may listen to and/or watch the incoming personalized audio or video invitation and then further Accept or Reply with a Message or Reject request as noted above. Once the call recipient accepts the call request, the MobiLine app is initiated and the process proceeds as discussed above with respect to the screenshots of FIGS. 6e-6f.

The same process is used when a personalized audio invitation is used to initiate a phone call. In this case, the call initiator (Subscriber A) may initiate a live call request using a personalized audio invitation. All processes as described above remain the same except that the personalized video invitation is replaced by a personalized audio invitation of the call initiator (Subscriber A). The personalized audio invitation optionally may be sent with a picture of the call initiator. The call initiator awaits the response from the call recipient as described above in connection with a live video call invitation.

Multi-Function Button

In further sample embodiments, the user's communications interface may include a multi-function button that allows the Subscriber to choose between the "Pre-Screen Call" and "Direct Call" functionality in a single step process. In sample embodiments, upon selecting the call recipient, the multi-function button may be selected during a short animation duration to place a Direct Call (traditional call without personalized invitation) to the call recipient. After the short animation duration, if the multi-action button has not been pressed, then the recording of the personalized audio or video invitation commences. At the end of the recording, the personalized audio or video invitation is sent with the call completion information to the call recipient for review, and the call from the call initiator is placed on hold while the personalized audio or video invitation is being reviewed, as in the other embodiments described above. In this fashion, the multi-function button enables the call initiator to select between a "Pre-Screen Call" and a "Direct Call" with a simple push of the multi-action button at the appropriate time.

Figure 7A:
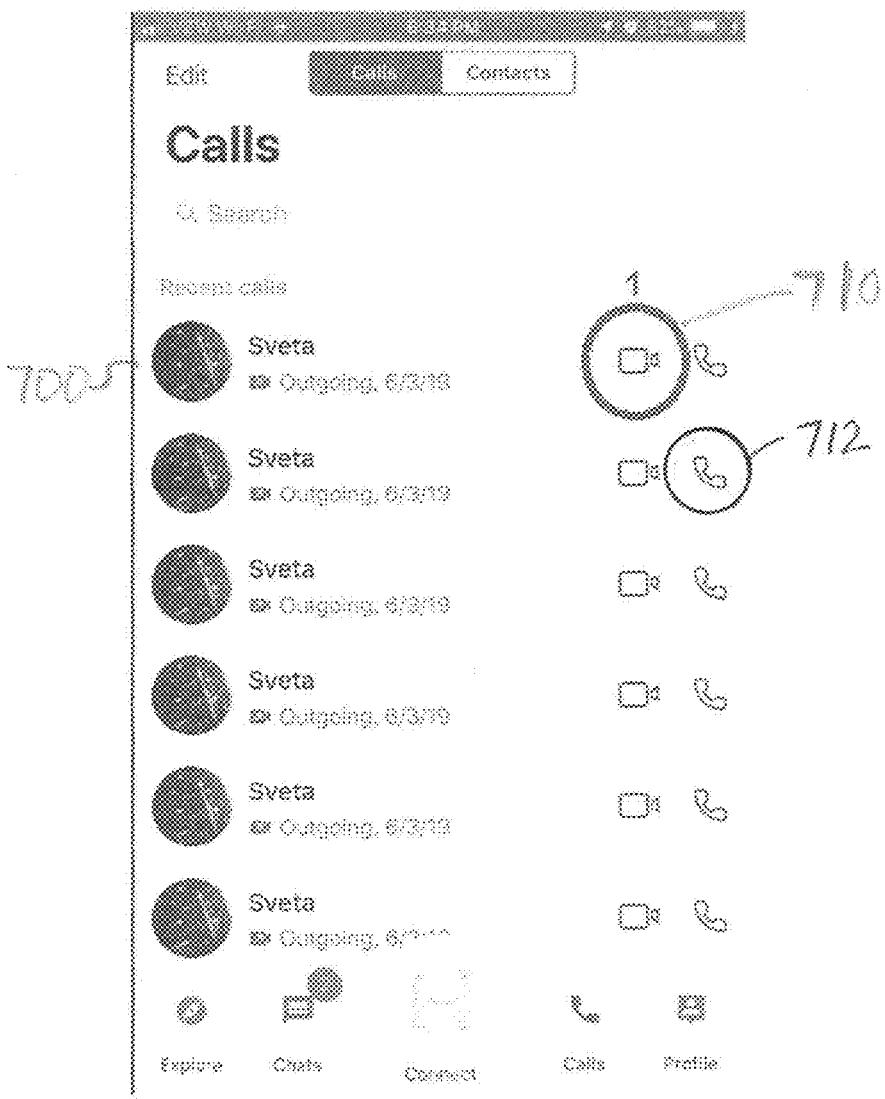
FIGS. 7*a*-7*c* illustrate screen shots of a call initiator's mobile smart phone interface illustrating use of the multi-function button in sample embodiments.

FIG. 7a illustrates a screen shot of a call initiator's mobile smart phone interface when selecting a recipient for an audio or video call from a list of previous calls. As illustrated, the call initiator selects the call recipient 700 from list 705 of call details and clicks on the "Video Camera" icon 710 to initiate a video call request or the phone icon 712 to initiate an audio call request. It will be appreciated that the list 705 of call details typically lists calls recently made, received, or missed by the call initiator. Pursuant to the techniques described above with respect to FIGS. 1-6, selection of the Video Camera icon 710 by the call initiator initiates the video call process and selection of the phone icon 712 by the call initiator initiates the audio call process.

Figure 7B:
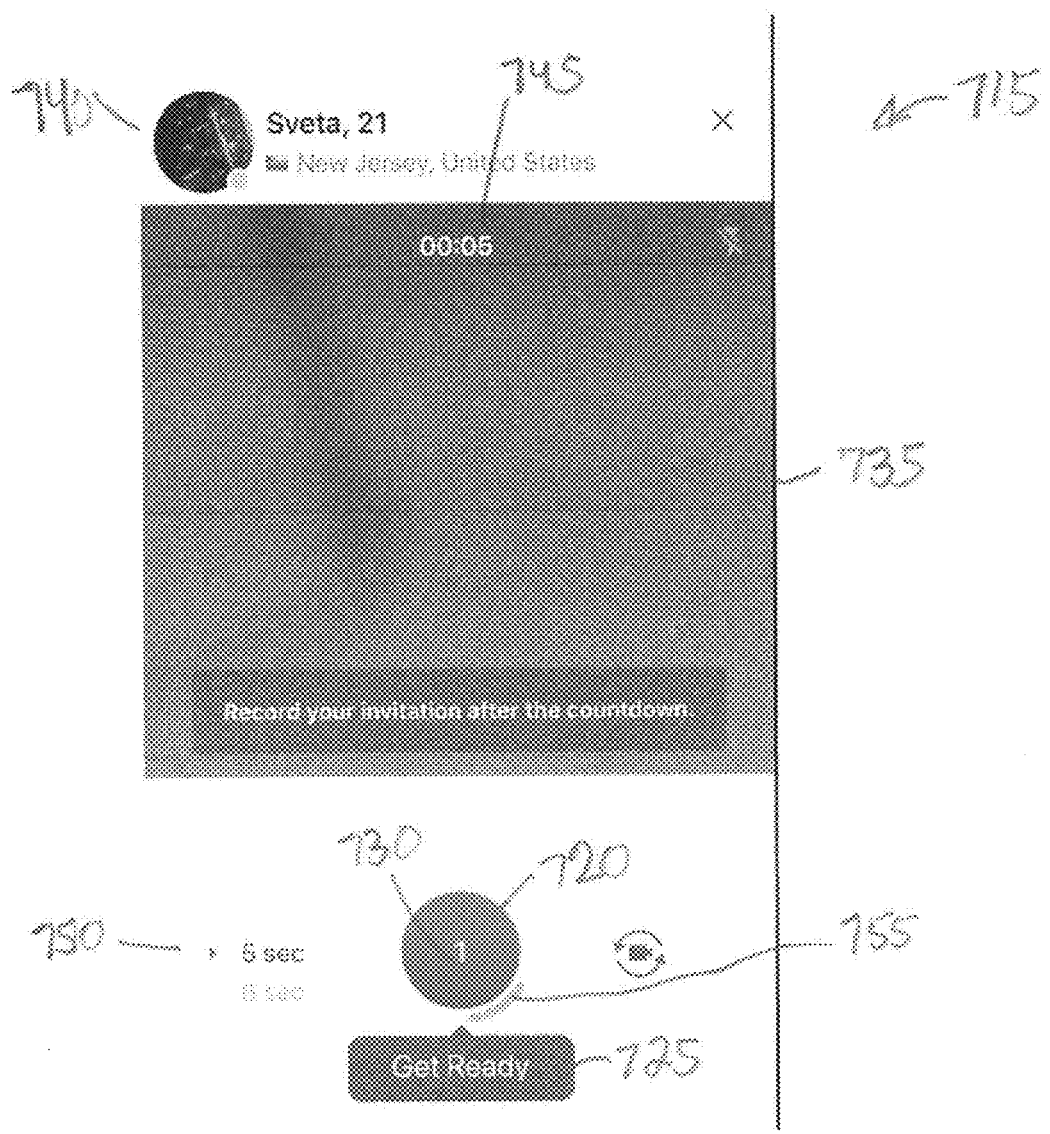

After the call initiator selects the "Video Camera" icon 710 to initiate the video call request, the call initiator is presented with the screen shot of FIG. 7b, which illustrates the call initiator's mobile smart phone interface 715 when preparing to record a personalized video invitation. As illustrated in FIG. 7b, the selection of the "Video Camera" icon 710 initiates the interface 715 with the multi-function button 720 that enables the call initiator to select whether to send the call as a Pre-Screen Call with a personalized video invitation as described above or as a Direct Call. As described above, in the case of the Pre-Screen Call, the call initiator records the video message and then places the call. The recorded message serves as an explanation of the cause of the incoming call for the recipient, who sees and hears what the incoming call is about before answering the call. On the other hand, the Direct Call allows the call initiator to place a video call directly to the recipient. Similarly, selection of the phone icon 712 initiates the interface 715 with the multi-function button 720. The process is the same as for a video call except that no image is presented.

As illustrated in FIG. 7b, the interface 715 initially presents the call initiator with a multi-function button 720 that counts down the time until the call initiator is to record the personalized invitation. As illustrated in FIG. 7b, the countdown may include a notice 725 to "Get Ready," and the multi-function button 720 may further include the countdown timer 730. The interface 715 may further include the call recipient's profile picture in space 735 as a visual cue, as well as the call recipient's basic details at 740, including, for example, the call recipient's Name, Age, and Location information (if allowed by the call recipient). The interface 715 may also include the duration (in seconds) at 745 for the pre-screen recording message that defines the duration of the recording for the personalized audio or video invitation. The duration (in seconds) may be selected by the call initiator at 750. For example, the duration of the call may be selected to span 5-15 seconds. During the countdown to the start of the audio or video recording, the multi-function button 720 proceeds with an animated timer that, in the illustrated example, includes in addition to the countdown timer 730 a cursor 755 that runs around the circumference of the multi-function button 720 while counting down.

Figure 7C:
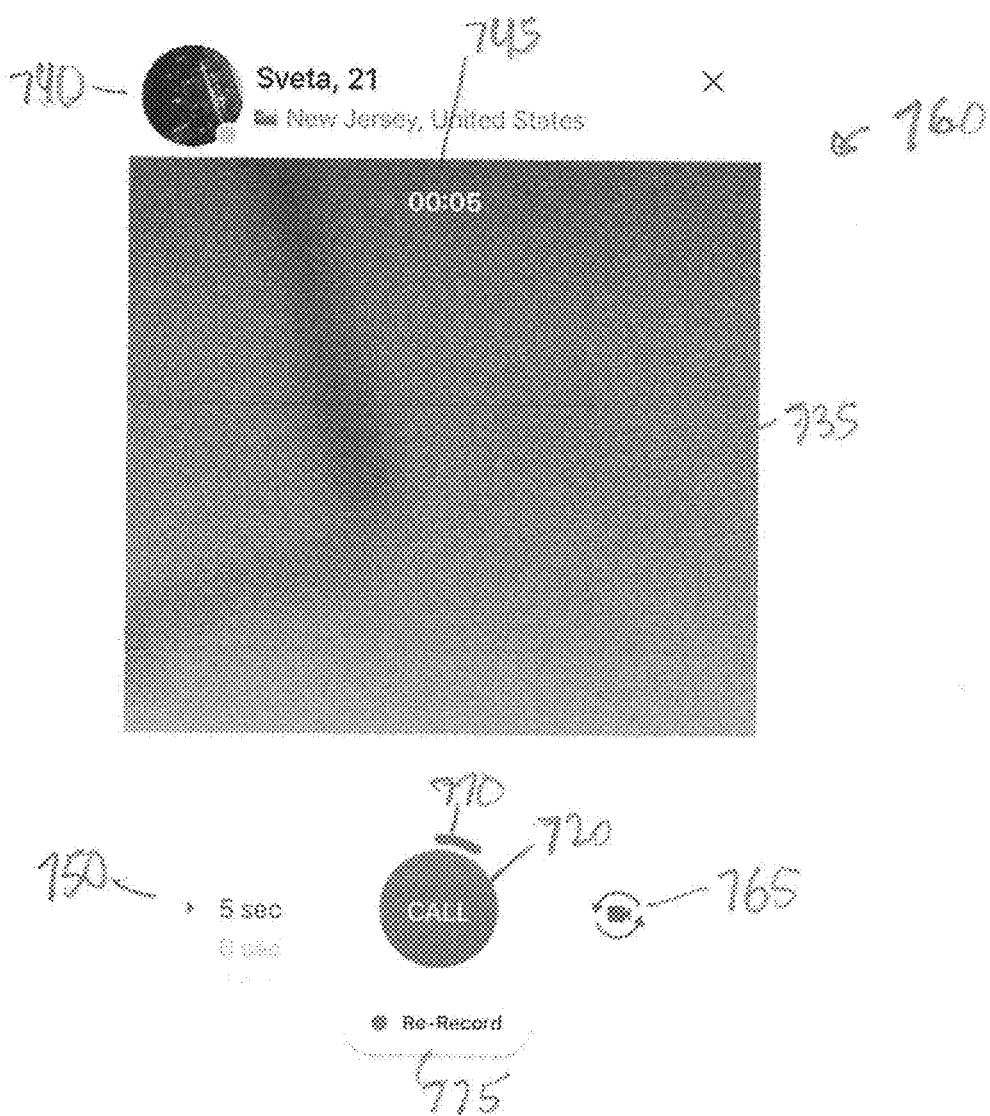

At the conclusion of the animation duration (e.g., 3 seconds) counting down to the start of the personalized audio or video message recording for the Pre-Screen Call, the interface 715 switches to the call initiator's mobile smart phone interface 760 for recording the audio or video invitation illustrated in FIG. 7c. During the audio or video recording, the space 735 displays the audio or video message as it is being recorded, and the duration timer 745 counts down. At this time, the multi-function button 720 presents an animation representing the ongoing audio or video recording, which serves as the real-time message recording. The multi-function button 720 may count down during the recording and change to "Call" for the call initiator to press to initiate the call at the conclusion of the audio or video recording. Also, the camera direction may be changed from a front facing camera to a rear facing camera and vice versa by selecting button 765. The recording progress may be further indicated by a cursor 770 that runs around the circumference of the multi-function button 720 while counting down to the end of the audio or video recording. Finally, the call initiator is given the option to re-record the audio or video recording by pressing re-record button 775.

In sample embodiments, the multi-function button 720 enables the call initiator to skip the audio or video recording sequence of FIG. 7c if the multi-function button 720 is pressed during the animation period prior to the start of the audio or video recording. If the multi-action button 720 is pressed during the animation period prior to the start of the audio or video recording, then the call request is changed to a "Direct Call," and the call is immediately placed to the call recipient without the personalized audio or video message.

If the call initiator intends to make a "Direct Call" but fails to click the multi-function button 720 during the animation period, then while recording of the audio or video message is in process, the call initiator may select the "re-record" button 775 to cancel the recording, and the animation prior to the start of the audio or video recording is repeated. While the animation is active, the call initiator is given another opportunity to press the multi-function button 720 and to thus modify the call-type to "Direct Call." The call is then placed to the recipient without the audio or video message as desired.

Thus, if the call initiator does not click multi-function button 720 during the time that the notice "Get Ready" is displayed, then the visual presentation of the multi-function button 720 is modified to count down during the recording and to present the caption "CALL" as illustrated in FIG. 7c upon completion of the recording. Once the multi-function button 720 is selected while displaying "CALL," the recorded message is presented to the intended call recipient with the incoming call request as described above with respect to the embodiments of FIGS. 1-6. On the other hand, the Pre-Screen Call may start automatically upon completion of recording the user message, based on the user settings.

System Architecture

FIG. 1 illustrates an example a high-level client-server-based network architecture 100. As illustrated, the system 100 provides server-side functionality via a network 104 (e.g., the Internet or wide area network (WAN)) to one or more client devices 102, 106, and 108. As will be appreciated by those skilled in the art, each client device 102, 106, and 108 conventionally includes a web client, an application such as the MobiLine app described herein, a memory that stores instructions and application data, and a processor for implementing those instructions.

In sample embodiments, the client devices 102, 106 and 108 may comprise, but are not limited to, a mobile smart phone, desktop computer, laptop, portable digital assistants (PDAs), smart phones, tablets, ultra-books, netbooks, laptops, multi-processor systems, microprocessor-based or programmable consumer electronics, game consoles, set-top boxes, or another communication device that a user may utilize to access the networked system 100. In some embodiments, the client device 102, 106, and 108 may comprise a display module (not shown) to display information (e.g., in the form of user interfaces). In further embodiments, the client device 102, 106, and 108 may comprise one or more of touch screens, accelerometers, gyroscopes, cameras, microphones, global positioning system (GPS) devices, and so forth. One or more users may be a person, a machine, or other means of interacting with client device 102, 106, and 108. In embodiments, the user is not part of the network architecture 100 but may interact with the network architecture 100 via client device 102, 106, and 108 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMAX network, another type of network, or a combination of two or more such networks.

Each of the client devices 102, 106, and 108 may include one or more applications (also referred to as "apps") such as, but not limited to, a web browser, messaging application, electronic mail (email) application, the MobiLine app referenced herein, and the like.

In sample embodiments, the web server 110 may provide programmatic and web interfaces respectively to one or more application servers (not shown) that are, in turn, coupled to one or more database servers (not shown) to facilitate access to databases 112 and 114. In example embodiments, the databases 112 and 114 store digital data representative of the Subscriber profiles and audio/visual invitations as described herein. Further, while the client-server-based network architecture 100 shown in FIG. 1 employs a client-server architecture, the present inventive subject matter is of course not limited to such an architecture, and could equally well find application in a distributed, or peer-to-peer, architecture system, for example.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software architectures are used in conjunction with hardware architectures to create devices and machines tailored to particular purposes. For example, a particular hardware architecture coupled with a particular software architecture will create a mobile device, such as a mobile smart phone, tablet device, or so forth. A slightly different hardware and software architecture may yield a smart device, while yet another combination produces a server computer for use within a cloud computing architecture. Not all combinations of such software and hardware architectures are presented here as those of skill in the art can readily understand how to implement the invention in different contexts from the disclosure contained herein.

Those skilled in the art will appreciate that the processes described herein with respect to FIGS. 1-7 may be implemented on respective mobile devices including processors adapted to process instructions from a computer readable medium for implementing the indicated processes such as those described with respect to FIGS. 3 and 4 and on a processing device such as a web server 110 including a processor or processors adapted to process instructions from a computer readable medium for implementing the indicated processes such as those described with respect to FIG. 5. As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or a suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., web server 110), such that the instructions, when executed by one or more processors of the machine cause the machine to perform one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components of the mobile devices may include a wide variety of components to receive input, provide output, produce output, transmit information, exchange information, capture measurements, and so on. The specific I/O components that are included in a particular mobile device will depend on the type of mobile device. For example, mobile smart phones likely include a touch input device or other such input mechanisms. It will be appreciated that the I/O components may include many other components that are not shown in the figures.

Communication may be implemented using a wide variety of technologies. The I/O components of the mobile devices 102, 106, for example, may include communication components operable to couple the mobile device 102, 106 to mobile communication network 104 or devices such as web server 110. For example, the communication components may include a network interface component or other suitable device to interface with the mobile communication network 104. In further examples, communication components may include wired communication components, wireless communication components, cellular communication components, Near Field Communication (NFC) components, Bluetooth® components (e.g., Bluetooth® Low Energy), Wi-Fi® components, and other communication components to provide communication via other modalities. The mobile devices 102, 106 also may include any of a wide variety of peripheral devices (e.g., a peripheral device coupled via a Universal Serial Bus (USB)). In addition, a variety of information may be derived via the communication components such as location via Internet Protocol (IP) geo-location, location via Wi-Fi® signal triangulation, location via detecting a NFC beacon signal that may indicate a particular location, and so forth.

In various example embodiments, one or more portions of the mobile communication network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the mobile communication network 104 or a portion of the mobile communication network 104 may include a wireless or cellular network and a coupling including a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The information and instructions transmitted or received over the mobile communications network 104 may use a transmission medium via a network interface device (e.g., a network interface component included in the communication components) and utilize one of a number of well-known transfer protocols (e.g., hypertext transfer protocol (HTTP)). Similarly, the information and instructions may be transmitted or received using a transmission medium via coupling devices.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to a single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A method for providing the identity of a call initiator caller prior to acceptance of a call by a call recipient, comprising:
presenting a recording interface including a multi-function button that, upon selection during a countdown duration, initiates a call to the call recipient;
when the multi-function button is not selected during the countdown period and prior to initiating the call, the call initiator's communication device recording a personalized audio or video invitation from the call initiator and, upon completion of the recording, the call initiator's communication device initiating the call by providing a call request message including the personalized audio or video invitation from the call initiator and call completion information needed to provide real-time communication with the call recipient's communication device prior to and after acceptance of the call;
the call initiator receiving from the call recipient an indication of the progress of the review of the personalized audio or video invitation by the call recipient; and
upon receipt of a notification from the call recipient that the call is accepted pursuant to review of the personalized audio or video invitation by the call recipient, enabling a live voice connection between the call initiator and call recipient using the call completion information.

2. The method of claim 1, wherein the personalized audio or video invitation includes an explanation of a reason for the call.

3. The method of claim 1, wherein the call completion information comprises session description protocol data and a message ID that is unique to the call.

4. The method of claim 1, further comprising presenting an animation during the countdown duration counting down to the start of the recording of the personalized audio or video invitation and changing the appearance of the multi-function button after the countdown duration.

5. The method of claim 4, further comprising reinitiating the animation during the countdown duration upon selection of a re-record button while recording of the personalized audio or video invitation is in process.

6. The method of claim 1, wherein enabling a live voice connection between the call initiator and call recipient using the call completion information further comprises:
a server receiving the call request message including the personalized audio or video invitation and call completion information needed to provide real-time communication between the call initiator and the call recipient prior to and after acceptance of the call;
the server parsing the call request message and uploading the call completion information and the personalized audio or video invitation to a storage device;
the server providing the call request message to the call recipient for evaluation; and
upon receipt of an indication of acceptance by the call recipient of the call initiator's request for a call, notifying the call initiator that the call recipient has accepted the call in response to the personalized audio or video invitation.

7. A method for enabling call completion based on a response by a call recipient to a personalized audio or video invitation from a call initiator, comprising:
presenting a recording interface including a multi-function button that, upon selection during a countdown duration, initiates a call to the call recipient;
when the multi-function button is not selected during the countdown period and prior to initiating the call, the call initiator's communication device recording a personalized audio or video invitation from the call initiator and, upon completion of the recording, the call initiator's communication device initiating the call by providing a call request message including the personalized audio or video invitation from the call initiator and call completion information needed to provide real-time communication with the call recipient's communication device prior to and after acceptance of the call;
a server receiving the call request message including the personalized audio or video invitation and call completion information needed to provide real-time communication from the call initiator to the call recipient;
the server parsing the call request message and uploading the call completion information and the personalized audio or video invitation to a storage device;
the server providing the call request message to the call recipient for evaluation;
the server providing an indication to the call initiator of the progress of the review of the personalized audio or video invitation by the call recipient;
upon receipt of an indication of acceptance by the call recipient of the call initiator's request for a call, the server notifying the call initiator that the call recipient has accepted the call in response to the personalized audio or video invitation; and
enabling a live voice connection between the call initiator and call recipient using the call completion information.

8. The method of claim 7, wherein the personalized audio or video invitation includes an explanation of a reason for the call.

9. The method of claim 7, wherein the call completion information comprises session description protocol data and a message ID that is unique to the call.

10. The method of claim 7, further comprising presenting an animation during the countdown duration counting down to the start of the recording of the personalized audio or video invitation and changing the appearance of the multi-function button after the countdown duration.

11. The method of claim 10, further comprising reinitiating the animation during the countdown duration upon selection of a re-record button while recording of the personalized audio or video invitation is in process.

12. The method of claim 7, wherein enabling a live voice connection between the call initiator and call recipient using the call completion information further comprises:
a server receiving the call request message including the personalized audio or video invitation and call completion information needed to provide real-time communication between the call initiator and the call recipient prior to and after acceptance of the call;
the server parsing the call request message and uploading the call completion information and the personalized audio or video invitation to a storage device;
the server providing the call request message to the call recipient for evaluation; and upon receipt of an indication of acceptance by the call recipient of the call initiator's request for a call, notifying the call initiator that the call recipient has accepted the call in response to the personalized audio or video invitation.

13. A communication system that provides the identity of a call initiator prior to acceptance of a call by a call recipient, comprising:
  a call initiating communication device including a recording device and adapted to present a recording interface including a multi-function button that, upon selection during a countdown duration prior to recording, initiates a call to the call recipient, and when the multi-function button is not selected during the countdown duration and prior to initiating the call, to record, using the recording device, a personalized audio or video invitation from the call initiator and, upon completion of the recording, to initiate the call by providing a call request message including the personalized audio or video invitation from the call initiator and call completion information needed to provide real-time communication with the call recipient's communication device prior to and after acceptance of the call;
  a call receiving communication device adapted to enable the call recipient to review the personalized audio or video invitation to determine whether to accept the call; and
  a server adapted to manage communication between the call initiating communication device and the call receiving communication device during evaluation of the personalized audio or video invitation prior to establishment of the call and to enable a live voice connection between the call initiator and call recipient using the call completion information upon acceptance of the call by the call recipient,
  wherein the call initiating communication device receives from the call receiving communication device an indication of the progress of the review of the personalized audio or video invitation by the call recipient and displays the indication to a display of the call initiating communication device.

14. The communication system of claim 13, wherein the server is further adapted to manage profiles of Subscribers, to manage searches for Subscribers, and to store introductory audio or video profile recordings from the Subscribers, wherein the call initiator searches the profiles of Subscribers to identify the call recipient.

15. The communication system of claim 13, wherein the personalized audio or video invitation includes an explanation of a reason for the call.

16. The communication system of claim 13, wherein the call completion information comprises session description protocol data and a message ID that is unique to the call.

17. The communication system of claim 13, wherein the call initiating communication device receives and displays status information from the call receiving communication device to indicate to the call initiator a status of the review of the personalized audio or video invitation by the call recipient.

18. The communication system of claim 13, wherein the call initiating communication device presents an animation during the countdown duration counting down to the start of the recording of the personalized audio or video invitation and changes the appearance of the multi-function button after the countdown duration.

19. The communication system of claim 18, wherein the recording interface of the call initiating communication device includes a re-record button, wherein selection of the re-record button while recording of the personalized audio or video invitation is in process reinitiates the animation during the countdown duration.

20. The communication system of claim 13, wherein the server receives the call request message including the personalized audio or video invitation and call completion information needed to provide real-time communication from the call initiating communication device, parses the call request message and uploads the call completion information and the personalized audio or video invitation to a storage device, provides the call request message to the call receiving communication device for evaluation by the call recipient, receives an indication of acceptance by the call recipient of the call initiator's request for a call, notifies the call initiating communication device that the call recipient has accepted the call in response to the personalized audio or video invitation, and completes the call using the call completion information.

* * * * *